3,595,743
FIVE STAGE WOODPULP BLEACHING PROCESS

Ola Sepall, Quebec, Quebec, Canada, assignor to Anglo Paper Products, Limited, Quebec, Quebec, Canada
No Drawing. Filed Feb. 28, 1969, Ser. No. 803,398
Int. Cl. D21c 3/02, 3/26
U.S. Cl. 162—89                          5 Claims

ABSTRACT OF THE DISCLOSURE

A bleaching sequence for woodpulps seeks to achieve reduced chemical and steam requirements with improved quality of pulp. The sequence comprises a treatment in five stages with (1) a chlorination preferably but not essentially with addition of some chlorine dioxide, (2) an extraction with alkali, (3) a chlorine dioxide treatment with 0.2–0.8% chlorine dioxide, (4) a hypochlorite treatment, and (5) a final chlorine dioxide treatment.

---

The development of bleaching technology has demonstrated that two sequences in particular have been the most effective for kraft woodpulps and have come into widespread commercial use. They comprise treatments either in five stages (1) chlorination, (2) alkali extraction, (3) chlorine dioxide, (4) alkali extraction, and (5) chlorine dioxide; or in six stages (1) chlorination, (2) alkali extraction, (3) hypochlorite, (4) chlorine dioxide, (5) alkali extraction, and (6) chlorine dioxide. The first is favored by lower capital cost while the latter has the advantage generally of lower chemical cost. Both sequences are considered to be about equal in providing good product quality with maximum brightness and minimal strength degradation.

The present invention resides in a five stage sequence of (1) chlorination, (2) alkali extraction, (3) chlorine dioxide, (4) hypochlorite, and (5) chlorine dioxide, which, when conducted under prescribed conditions, is capable of achieving the low chemical cost of the six stage sequence in current use. The important condition resides in the quantity of chlorine dioxide employed in the third stage. Usual practice is the addition of essentially as much chemical as is capable of being consumed by the pulp. It has now been found that if significantly less chlorine dioxide is added, and the quantity need only be more than a certain minimum to achieve the desirable results, hypochlorite can be applied in the fourth stage to advantage and without the loss of pulp strength otherwise experienced. The use of hypochlorite provides a lower chemical cost and also permits a lower temperature to be used in stages (3) and (4) with an important saving in steam as a further advantage. Under these conditions, the five stage sequence of (1) chlorination, (2) alkali extraction, (3) chlorine dioxide, (4) hypochlorite, and (5) chlorine dioxide, is equal in economy to the six stage sequence.

The first stage, in accordance with the invention, is conducted in a conventional way. Chlorine is reacted with the pulp in a quantity corresponding approximately to the maximum that is consumed.

The second stage is also conducted conventionally. Thus, after washing, alkali, such as caustic soda, is added in a quantity sufficient to provide a distinctly alkaline medium with, preferably, elevated temperatures to enhance extraction.

In the third stage, the treatment is with chlorine dioxide but the quantity employed is limited to less than can readily be reacted. For example, with kraft pulp, the usual quantity added is 1.0–1.5% $ClO_2$, whereas the desirable quantity in accordance with the invention is less than 1.0% and can be as low as 0.2% although a more desirable amount is about 0.5%.

Because of the use of this substantially lesser quantity of $ClO_2$, a following hypochlorite stage is conducted without risk of degradation. For example, with 0.5% $ClO_2$ at 100° F. in stage 3, about 0.7% chlorine as hypochlorite is suitable in stage 4 at 100° F. It has been found that the combination of $a\%$ $ClO_2$ in stage 3 with $b\%$ chlorine as hypochlorite in stage 4 is at least as effective as a $+b\%$ $ClO_2$ in stage 3 and a conventional extraction in stage 4. Therefore, the use of hypochlorite is desirable because of its much lower unit cost in comparison with chlorine dioxide. Sodium or calcium hypochlorite may be employed.

In the final fifth stage, chlorine dioxide addition and temperature are selected in a conventional way to provide desired final brightness. For maximum brightness, a temperature of about 170° F. is desirable for several hours with $ClO_2$ additions ranging up from about 0.2%.

Examples of the results achieved in accordance with the invention are given in Table I:

TABLE I.—SOFTWOOD KRAFT PULP SAMPLE (TAPPI PERMANGANATE NO. 24.0)

| | 1 | 2 | 3 | 4 | 5 |
|---|---|---|---|---|---|
| Stage 1; 7.1% chlorine at 75° F. for 90 minutes at 3% consistency with 0.1% chlorine dioxide | | | | | |
| Stage 2; 4.0% caustic soda at 140° F. for 120 minutes at 12% consistency | | | | | |
| Stage 3: | | | | | |
|   Chlorine dioxide, percent on o.d. pulp | 0 | 0.2 | 0.3 | 0.5 | 1.0 |
|   Temperature, °F | | 100 | 100 | 100 | 140 |
|   Time, minutes | | 120 | 120 | 120 | 180 |
|   Consistency, percent | | 12 | 12 | 12 | 12 |
| Stage 4: | | | | | |
|   Caustic soda, percent (total) | 1.7 | 1.6 | 1.5 | 1.5 | 1.0 |
|   Chlorine percent (as hypochlorite) | 1.2 | 1.0 | 0.9 | 0.7 | 0 |
|   Temperature, °F | 100 | 100 | 100 | 100 | 140 |
|   Time, minutes | 120 | 120 | 120 | 120 | 120 |
|   Consistency, percent | 12 | 12 | 12 | 12 | 12 |
| Stage 5: | | | | | |
|   Chlorine dioxide, percent | 0.6 | 0.6 | 0.6 | 0.6 | 0.6 |
|   Temperature, °F | 160 | 160 | 160 | 160 | 160 |
|   Time, minutes | 180 | 180 | 180 | 180 | 180 |
|   Consistency, percent | 12 | 12 | 12 | 12 | 12 |
| Brightness, Elrepho | 88.2 | 88.3 | 88.4 | 90.1 | 88.7 |
| Reverted brightness, Elrepho (after 1 hour at 105° C.) | 83.4 | 83.9 | 84.7 | 86.6 | 86.2 |
| TAPPI, disperse viscosity | 19.3 | 20.3 | 20.6 | 21.7 | 21.4 |

The data demonstrate the ability of hypochlorite in stage 4 to replace chlorine dioxide in stage 3 without sacrificing product quality. The data also show the desirability of applying at least about 0.5% chlorine dioxide in stage 3 to obtain good brightness stability.

Sample 5 represents a conventional five stage sequence and it is clear that the preferred conditions of the present invention shown by sample 4 are capable of providing equal, if not better, quality with a saving in steam in stages 3 and 4 as well as in chemical cost. It is a fairly general condition that chlorine dioxide is at least twice as costly as sodium hypochlorite on the basis of comparing one pound of chlorine dioxide with one pound of chlorine as hypochlorite.

Attention is drawn particularly to the values of reverted brightness which are a better indication of brightness that can be obtained in commercial practice after exposure to hot drying operations.

It is evident that the quantity of chlorine dioxide in stage 3 can be greater than 0.5% but to obtain significant cost advantage, a substantial reduction in total usage is desirable. About 0.8% chlorine dioxide is believed to be the maximum desirable.

Table II shows strength properties of pulps bleached in accordance with the invention. No significant differences in strength properties were found, indicating that degradation, if any occurred, was negligible.

TABLE II.—STRENGTH PROPERTIES OF SOFTWOOD KRAFT PULPS

|  | A | | B | |
|---|---|---|---|---|
|  | Unbleached | Bleached | Unbleached | Bleached |
| Valley beater tests according to TAPPI procedures | (¹) | | (¹) | |
| At 300 Canadian Standard Freeness: | | | | |
| Burst factor | 98 | 98 | 92 | 90 |
| Breaking length, km | 12.0 | 11.9 | 11.2 | 10.8 |
| Tear factor | 106 | 101 | 100 | 107 |

¹ No. 2 in Table I.

Table III shows results of comparison tests of the conventional six stage bleaching sequence previously mentioned (referred to as CEHDED) and the five stage sequence of the present invention (CEDHD):

TABLE III.—COMPARISON OF CEDHD AND CEHDED BLEACHING SEQUENCES

| Unbleached Kraft pulp | CEDHD sample | | | Unbleached Kraft pulp | CEHDED sample | | |
|---|---|---|---|---|---|---|---|
|  | A | B | C |  | A | B | C |
| TAPPI permanganate number | 17.3 | 20.6 | 26.3 | TAPPI permanganate number | 17.3 | 20.6 | 26.3 |
| First stage; chlorination with 65% of TAPPI demand for 90 minutes at 75° F. and 3% consistency with 0.1% chlorine dioxide added | | | | First stage; chlorination with 65% of TAPPI demand for 90 minutes at 75° F. and 3% consistency with 0.1% chlorine dioxide added | | | |
| Second stage; caustic extraction with 4% sodium hydroxide at 140° F. for 120 minutes at 12% consistency | | | | Second stage; caustic extraction with 4% sodium hydroxide at 140° F. for 120 minutes at 12% consistency | | | |
| Third stage; 0.5% chlorine dioxide for 120 minutes at 100° F. and 12% consistency | | | | Third stage; 1.1% chlorine as sodium hypochlorite for 120 minutes at 100° F. and 12% consistency | | | |
| Fourth stage; 0.8% chlorine as sodium hypochlorite for 120 minutes at 100° F. and 12% consistency | | | | Fourth stage, 0.3% chlorine dioxide at 130° F. for 4 hours at 12% consistency | | | |
| Fifth stage; 0.6% chlorine dioxide for 180 minutes at 175° F. and at 12% consistency | | | | Fifth stage; 0.3% sodium hydroxide at 170° F. for 2 hours at 12% consistency | | | |

|  |  |  |  |  | A | | B | | C | |
|---|---|---|---|---|---|---|---|---|---|---|
|  |  |  |  |  | 1 | 2 | 1 | 2 | 1 | 2 |
|  |  |  |  | Sixth stage; chlorine dioxide percent—at 175° F. for 180 minutes at 12% consistency | 0.3 | 0.5 | 0.3 | 0.5 | 0.3 | 0.5 |
| Final brightness, Elrepho | 91.1 | 91.4 | 91.5 | Final brightness, Elrepho | 90.8 | 90.4 | 91.3 | 91.5 | 91.5 | 91.8 |
| TAPPI viscosity | 17 | 24 | 24 | TAPPI viscosity | 18 | 18 | 29 | 27 | 24 | 23 |
| Total chlorine dioxide, percent | 1.1 | 1.1 | 1.1 | Total chlorine dioxide, percent | 0.6 | 0.8 | 0.6 | 0.8 | 0.6 | 0.8 |
| Total alkali after second stage | 1.4 | 1.4 | 1.4 | Total alkali after second stage | 2.0 | 2.0 | 2.0 | 2.0 | 2.0 | 2.0 |
| Total chlorine after second stage | 0.8 | 0.8 | 0.8 | Total chlorine after second stage | 1.1 | 1.1 | 1.1 | 1.1 | 1.1 | 1.1 |

It will be observed that the CEDHD sequence with five stages compares very favorably with the six stage sequence CEHDED in achieving high brightness without significant degradation and with low bleaching cost.

I claim:

1. A process of bleaching kraft woodpulp which consists of subjecting a body of said pulp to
   (a) a first stage chlorination treatment,
   (b) a second stage extraction treatment with alkali,
   (c) a third stage chlorine dioxide treatment wherein chlorine dioxide is used in a quantity of about 0.2 to about 0.8 wt. percent of said pulp,
   (d) a fourth stage hypochlorite treatment wherein said hypochlorite is used in a quantity exceeding about 0.1 wt. percent of said pulp as chlorine, and
   (e) a fifth and final stage chlorine dioxide treatment.

2. A process of bleaching woodpulp as defined in claim 1, wherein the quantity used of said chlorine dioxide in said third stage is about 0.5 wt. percent.

3. A process of bleaching kraft woodpulp which consists of subjecting a body of said pulp to a five stage treatment comprising
   (a) a first stage chlorination treatment,
   (b) a second stage extraction treatment with alkali,
   (c) a third stage chlorine dioxide treatment wherein chlorine dioxide is used in a quantity of about 0.2 to about 0.8 wt. percent of said pulp,
   (d) a fourth stage hypochlorite treatment wherein said hypochlorite is used in a quantity of about 0.1 to about 1.5 wt. percent of said pulp as chlorine, and
   (e) a fifth and final stage chlorine dioxide treatment.

4. A process of bleaching kraft woodpulp which consists of in sequence,
   (a) treating a body of said pulp with chlorine and chlorine dioxide, the quantity of said chlorine dioxide being substantially less than that of said chlorine,
   (b) washing said chlorinated pulp and subjecting the washed pulp to an extraction treatment with alkali,
   (c) treating said pulp with chlorine dioxide in a quantity of about 0.2 to about 0.8 wt. percent of said pulp,
   (d) treating said pulp with a hypochlorite in a quantity of about 0.1 to about 1.5 wt. percent of said pulp as chlorine, and
   (e) finally treating said pulp with chlorine dioxide in excess of about 0.2 wt. percent of said pulp.

5. A process of bleaching woodpulp as defined in claim 4, wherein said hypochlorite is selected from the group consisting of sodium hypochlorite and calcium hypochlorite.

References Cited

UNITED STATES PATENTS 3,501,374   3/1970   Jack et al.   162—89

OTHER REFERENCES

Casey, Pulp & Paper, 2nd Ed., vol. I, p. 505, pub. in 1960.

HOWARD R. CAINE, Primary Examiner

U.S. Cl. X.R.

162—66, 67